US006467727B1

(12) United States Patent
De Felipe

(10) Patent No.: US 6,467,727 B1
(45) Date of Patent: *Oct. 22, 2002

(54) SMOKE EXTRACTOR

(76) Inventor: Carlos L De Felipe, 516 Mokena Dr., Miami Springs, FL (US) 33166

( * ) Notice: Subject to any disclaimer, the term of this patent is extended or adjusted under 35 U.S.C. 154(b) by 0 days.

This patent is subject to a terminal disclaimer.

(21) Appl. No.: 09/738,460

(22) Filed: Dec. 16, 2000

Related U.S. Application Data

(63) Continuation-in-part of application No. 09/179,909, filed on Oct. 27, 1998, now Pat. No. 6,164,593.
(51) Int. Cl.[7] ............................................. B64D 13/00
(52) U.S. Cl. .................................................. 244/118.5
(58) Field of Search ..................................... 244/118.5

(56) References Cited

U.S. PATENT DOCUMENTS

| | | | | |
|---|---|---|---|---|
| 4,391,017 A | * | 7/1983 | Bruensicke | 244/118.5 |
| 4,552,325 A | * | 11/1985 | Bruensicke | 244/118.5 |
| 5,312,072 A | * | 5/1994 | Eklund | 244/118.5 |
| 6,164,593 A | * | 12/2000 | De Felipe | 244/118.5 |

* cited by examiner

Primary Examiner—Charles T. Jordan
Assistant Examiner—Francis T. Palo
(74) Attorney, Agent, or Firm—CUSPA Technology Law Associates

(57) ABSTRACT

An extractor system for extracting hazardous smoke or other unwanted gases in an aircraft is provided. The extractor system includes an external air receiver mounted on the exterior of the aircraft, a vent receptacle positioned inside the aircraft, and an air flow conduit tubing interconnecting the receiver and the vent receptacle. When the aircraft is in motion, air flow outside the aircraft enters the external air receiver and induces a suction force at the vent receptacle, which siphons out smoke and other unwanted gases in the interior of the aircraft. The system also includes a valve to control the suction force induced at the vent receptacle. Alternatively, the extractor system can be used on other moving vessels for extracting smoke or other unwanted gases in the vessels.

20 Claims, 3 Drawing Sheets

SMOKE EXTRACTOR

This application is a Continuation-In-Part of Non-Provisional patent application Ser. No. 09/179,909, filed Oct. 27, 1998, now U.S. Pat. No. 6,164,593.

FIELD OF THE INVENTION

The present invention relates to a device for the removal of smoke, fluids or gases from an aircraft. More specifically an autonomous device that can quickly drain out harmful smoke, fluids, gases, fumes, mist, products of combustion, vapors, condensation, foreign particles or other gaseous visual impairments that can erupt in a cockpit of airborne aircraft.

BACKGROUND OF THE INVENTION

In summer 1993 while on assignment overseas, near the small town of General Crespo, Entre Rios, Argentina, an airplane with 14 people on board had radioed an emergency due to heavy smoke in the cockpit and cabin. The crew informed the control tower that they could not see anything inside the aircraft because of the smoke. Minutes later the aircraft crashed in a field killing all aboard. The following investigation determined that a battery shorted out, melted and produced dense smoke and toxic gases that spread to the interior of the aircraft.

In recent years there have been worldwide a number of smoke/fires in the cockpit and cargo compartments of airplanes, some of which have resulted in serious accidents and loss of life. Although action has already been taken to increase the safety of these compartments by improving the fire-resistance of liners, the continuing occurrence and the seriousness of the consequences of fire have resulted in a review of countermeasures to minimize its effects.

Recent investigations conducted by several fire departments in the United States of America and England focus attention on the smoke as being pivotal in the loss of life of fires in enclosed structures as it silently builds up. This invention addresses the problem of the exhaustion of smoke and gases rather than the fire itself. This invention aims to reduce the accumulation of smoke in the cockpit by siphoning out the smoke before it adversely affects the flight crew and thereby allowing additional time for landing.

From the National Transportation Safety Board files:

Douglas MD-81: Shortly after departure on Oct. 16, 1993, heavy smoke emanating from the overhead electrical panel on a Swissair McDonnell Douglas MD-81, registration HB-INH, a regularly scheduled passenger flight from Munich to Zurich. On board the airplane were 88 passengers and seven crew members. The flight-crew reported they smelled something abnormal in the cockpit approximately 10 minutes after takeoff while the airplane was at an altitude of 18000 ft. A few moments later, increasingly dense smoke became noticeable in the area of the overhead panel. The flight crew declared an emergency and returned to Munich. The "Electrical Smoke in Cockpit" checklist did not provide guidance on how to identify the origin of the smoke or how to isolate the source of the fire because the smoke was rapidly thickening. The flight-crew was unable to read and complete the checklist, since visibility became extremely limited and coordination was difficult in the cockpit. The airplane was substantially damaged by smoke and overheated electrical components.

Beech 200: On Oct. 27, 1993, shortly after departing the Reno Canyon International Airport, a Beech Model 200 airplane, N191 FL, sustained an electrical fire causing the cockpit and cabin to fill with smoke. The pilot reported that the smoke became progressively more intense, greatly restricting visibility in the cockpit and making breathing increasingly difficult. To facilitate removal of the smoke, he opened the cabin pressurization dump valve and the storm window. He estimated that one additional minute of in-flight operation would have resulted in incapacitation. The pilot managed to return the airplane to the airport. The landing gear collapsed on touchdown and the airplane was substantially damaged, but none of the five persons aboard was injured.

Boeing 737-217: Smoke was observed in the cabin approximately 15 minutes after takeoff. The aircraft descended to below 10,000 ft. The cabin pressure was dumped and the plane proceeded to land. The smoke dissipated after landing. Maintenance personnel found a shorted out battery.

Lockheed 1011: In 1980, in the worst commercial in-flight fire and smoke accident in Saudi Arabia, a L-1011 aircraft with 300 pilgrims plus all crew members perished from smoke inhalation inside the aircraft. There was no simple way to evacuate the smoke in the cabin and cockpit while flying.

Douglas DC-8: 16 May 1996; while cruising at 35,000 feet, the flight crew saw a spark followed by smoke in the cockpit. The flight crew donned masks and goggles and initiated an emergency descent. The flight engineer attempted to isolate the smoke, but was unable to identify the source. After landing an inspection revealed that the glareshield ballast had burned out.

Douglas DC-9: In a fairly recent air disaster, a DC-9 of ValuJet Airlines crashed in the Everglades near Miami, Fla., killing all onboard. The preliminary investigation indicated that heavy smoke in the cockpit and cabin, which the pilots had reported, appeared to be the cause of the accident.

It is appropriate at this point to mention that in critical situations of electrical smoke in the cockpit during flight the make-up and toxicity of smoke changes drastically when different materials are present in a combustible environment. In addition to obscuring vision, inhalation of toxic gases causes dizziness, confusion, disorientation, and mental and physical incapacitation of the flight-crew, making it impossible to see properly or follow emergency procedures.

These events and the common denominator of smoke and hazardous gases/fluids in airborne aircraft, drove me to conceptualize a self-operated device that by just utilizing the aircraft motion would serve to alleviate the problem and would function even in case of electrical power interruption. In other words, a system would siphon smoke, gasses and fluids in aircraft out of the cockpit, without affecting internal conditions such as pressure, temperature, oxygen, and heat.

A cost effective aircraft fire suppression system is not yet a reality. The only components in a transport category airplane having fire extinguishing devices are the engines.

Two methods of smoke evacuation were found in following patents.

U.S. Pat. No. 4,552,325 (to Bruensicke) provides a smoke evacuation system for evacuating smoke from an interior cabin of a pressurized aircraft by providing a closed smoke evacuation outlet in the skin of the aircraft in communication with a smoke disposal chute extending upwardly from the cabin's ceiling. Upon activation of the outlet, smoke will be discharged into the external airstream, with the differential pressure between the relatively high pressure in the cabin and the relatively low pressure in the external atmosphere, particularly at the high cruising altitudes associated with operation of modern transport aircraft. Operation of the smoke evacuation system depends on the differential pressure between the interior and exterior, therefore, it might not function effectively at lower altitudes. On the other hand, this system provides means for evacuating smoke from the cabin portion of the aircraft only. However, most smoke related incidents occurred in cockpits and cargo holds. In the case of the ValuJet incident (1995) the smoke was generated in the cargo compartment. The device taught by this patent would have evacuated the smoke after it has passed through the passengers' cabin. Extensive structural modifications of an airplane are required to install this system.

U.S. Pat. No. 5,312,072 (to Eklund) teaches a smoke evacuation nozzle for removing smoke from passenger cabin of an airplane. The nozzle has a converging portion located in the space between passenger cabin ceiling and fuselage pressure hull, and a diverging portion located within dorsal fin. Eklund further teaches that the nozzle maintains sonic flow at both high cruising and low descent altitudes. However, function of the evacuation still depends on the differential pressure. Additionally, using this device exhausted smoke from cockpit or cargo would also have to pass the passenger cabin before being evacuated. Furthermore, extensive structural modifications of an airplane are also required to install this system.

The present invention overcomes these drawbacks and presents several advantages. It is an enduring lightweight device that will vent "in situ" the cockpits of almost any aircraft. It can be installed in few hours without major structural modifications or disruptions. As a result, the smoke is expelled in a more direct path from the cockpit to the outside of the vessel. And most importantly its suction function does not require electrical power, and does not depend on the pressure difference between the interior air pressure and exterior environmental pressure.

SUMMARY OF THE INVENTION

The objective of this invention is to provide the aviation transportation industries with a device, an aircraft smoke extractor, that in a smoke related emergency would provide for a quick and direct depletion of smoke, gases or other products of combustion from aircraft's cockpit without affecting the passenger compartment, and without using electrical power.

The aircraft smoke extractor of the invention accomplishes this objective with a minimum of components. The aircraft smoke extractor comprises an external air receiving means installed outside the aircraft, an internal vent receptacle means for the cockpit, and a air flow conduit tubing for interconnecting the external air receiving means and the internal vent receptacle means.

The aircraft smoke extractor of the present invention is positioned mainly in cockpit area, within easy reach of the flight-crew, to provide the shortest and direct path for smoke evacuation. Furthermore, the aircraft smoke extractor can also perform in conjunction with cabin or cargo smoke detectors. A control valve acting as flow regulator or stop is installed in the interconnecting air flow conduit tubing. This valve allows the aircraft smoke extractor to be installed in areas other than the cockpit if needed, but still being controlled by the flight-crew seated in the cockpit. In addition, the aircraft smoke extractor can also be positioned in the passenger cabin, and operated by flight attendants or passengers in case of emergency.

In the case of activation with aircraft pressurization, the aircraft smoke extractor of the present invention will leak out portion of this pressure together with the siphoning effect. If pressure is not present, the unit will simply siphon out the smoke or other unwanted gases. Because of this mechanism of operation, the aircraft smoke extractor can also be used in a myriad of other moving vessels including, but not limited to, trains, automobiles, trailers, boats, etc.

DETAILED DESCRIPTION OF THE INVENTION

Figure 1:
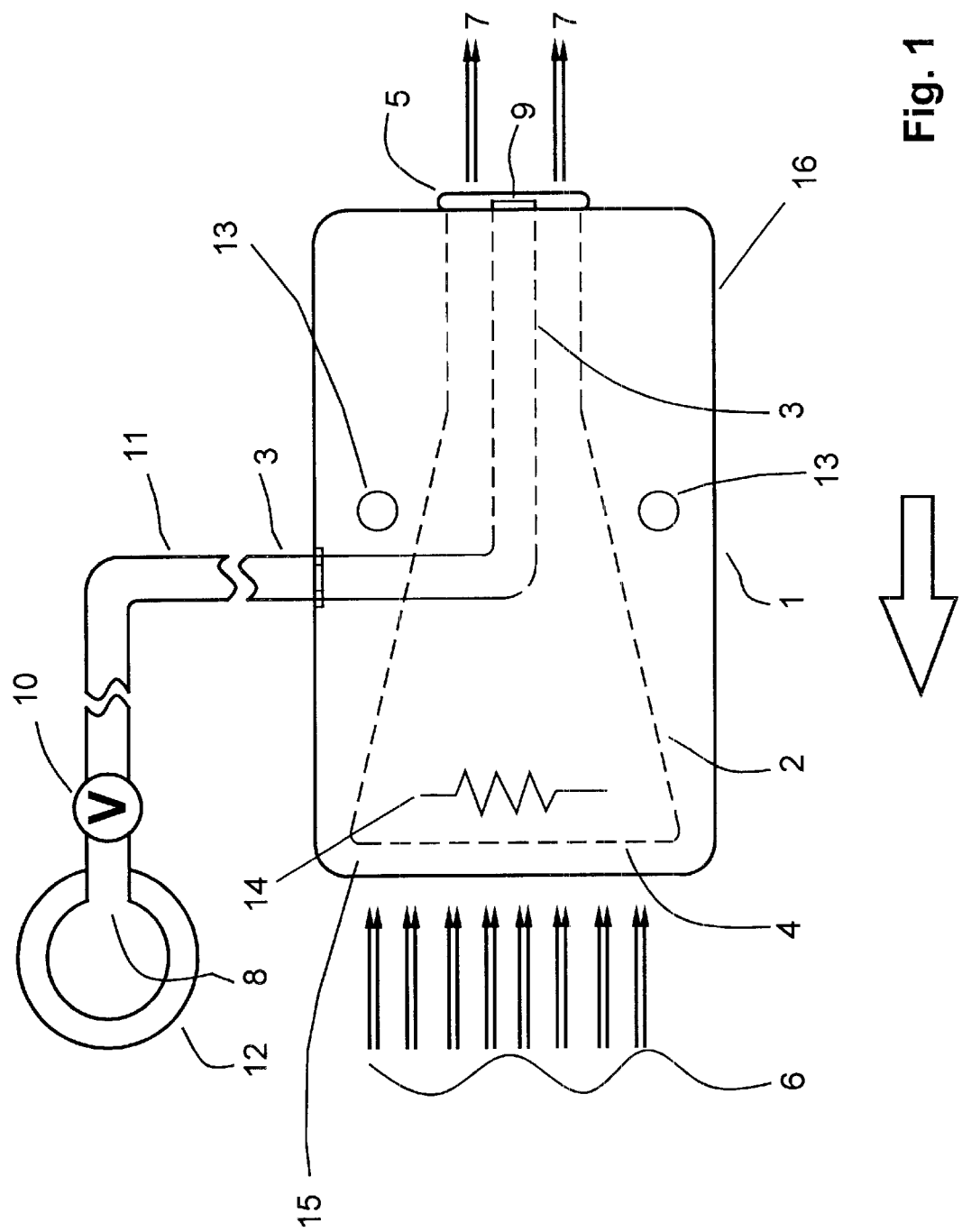
FIG. 1 shows a x-ray view of the aircraft smoke extractor in one embodiment of the present invention.

As shown in the drawings, the smoke/fluids extraction device in accordance with the present invention comprises two main sections. One of the sections is an external air receiving component, which is also called external air receiver 16. The external air receiver is mounted in a selected place on the fuselage, according to the vehicle's unique structure as per different model design, i.e., D-C9, D-C10, B-747, B-727, C172, etc. The other section is an interior component. The interior component is placed in the cockpit of the aircraft's enclosed structure as smoke suction means or vent receptacle(s) 12. The external air receiver and the vent receptacle are interconnected by an air flow conduit tubing 11, that includes, as an integral part, a valve 10 for preventing/enabling or regulating the air flow.

Figure 2:
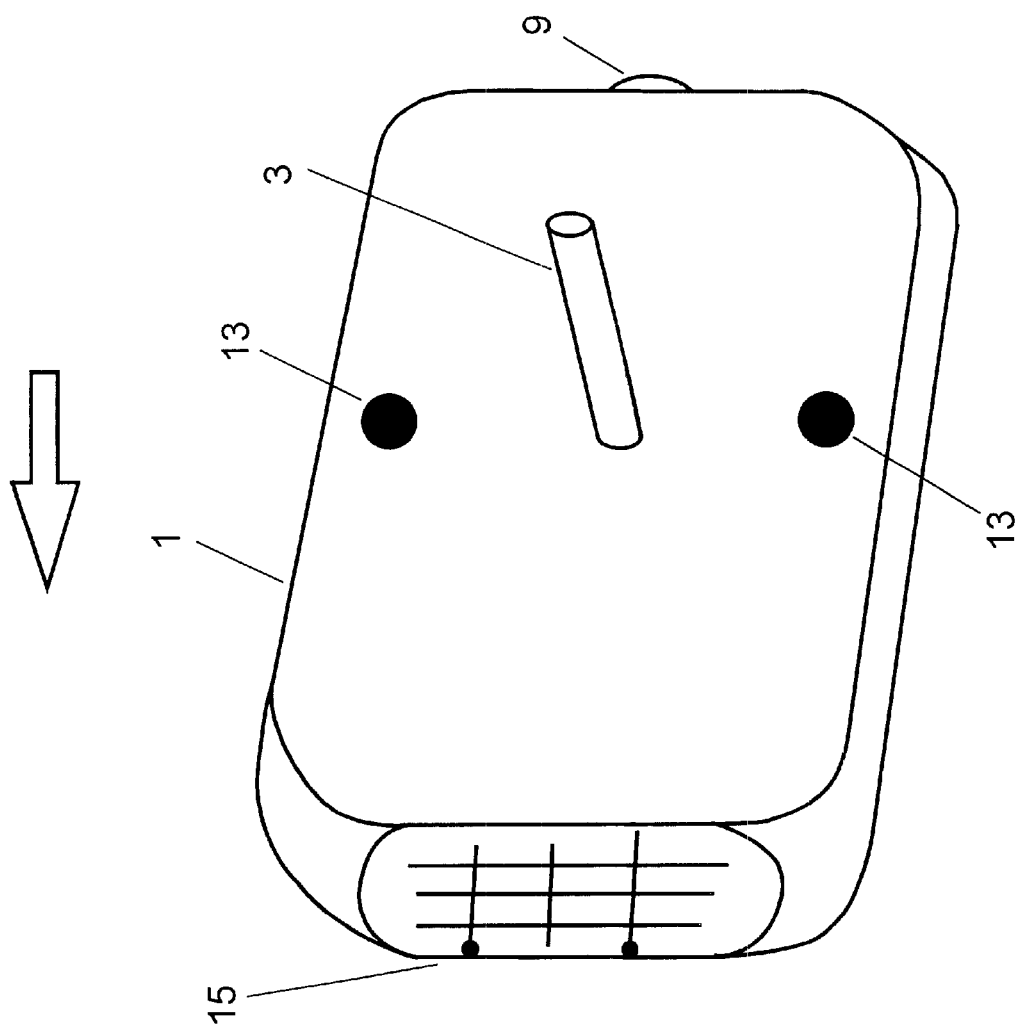
FIG. 2 shows a perspective view of the external air receiver.
Figure 4:
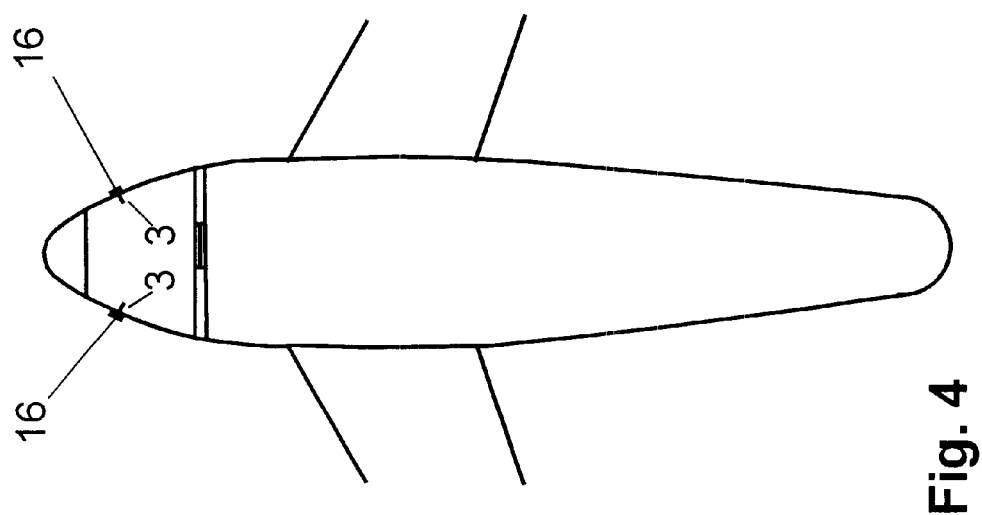
FIG. 4 shows the aircraft smoke extractor of the present invention installed at cockpit.
Figure 3:
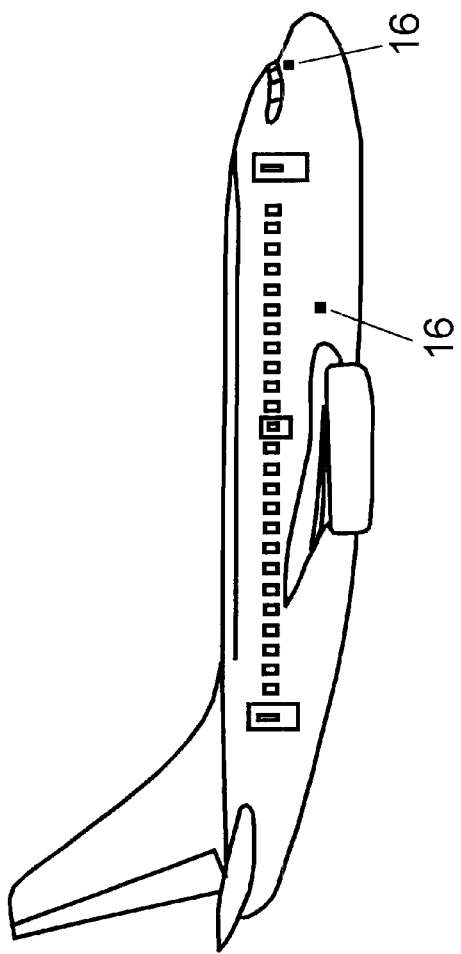
FIG. 3 shows possible locations for installing the aircraft smoke extractor on an airplane.

The external air receiver has an external housing case. The external housing case resides outside of a moving vessel such as the fuselage of an aircraft, as shown in FIG. 4. The external housing case 1 is manufactured using a strong cast material that could be molded or formatted in different sizes, lengths, and geometries. The shape, components, details and dimensions of the external housing case can be manufactured according to the structure of an aircraft, location and extraction requirements, displacement's medium, and speed of an aircraft or a vessel. The external housing case accommodates a molded internal chamber 2 designed in a funnel-like shape, which extends longitudinally inside the housing case. The chamber 2 has an opening of increased diameter or inlet as a ram air entrance 4, and has an end of reduced diameter as a ram air outlet 5. As shown in FIGS. 1 and 2, the external air receiver is so aligned that its ram air entrance 4 is aligned in the moving direction (pointed by the arrow) of an aircraft or a moving vessel, and the ram air outlet 5 is aligned in the opposite direction of the moving vessel.

Inside said chamber 2, is a hollow siphoning tubing 3 affixed at the center of the chamber, along the longitudinal axis of the chamber. The hollow siphoning tubing has a first end 9 centered concentrically with the ram air outlet of the chamber, and a second end connected to the air flow conduit tubing. As shown in FIGS. 1 and 2, the hollow siphoning tubing is bent, so that the second end of the hollow siphoning tubing exits from the chamber and the housing case in a direction perpendicular to the longitudinal axis of the chamber. There is a sufficient space between the hollow siphoning tubing and the ram air outlet of the chamber to allow a ram air passageway inside the chamber.

As soon as the aircraft, or vessel, is in motion, and as its velocity progresses into the ambient air, an airstream flows longitudinally over and around the aircraft's outer skin or fuselage from front to back, and meets the external air receiver of the present invention. As result of this encounter, a portion of this inward air flow 6 is engulfed by the receiver's ram air entrance 4. The air enters from the ram air entrance, and travels through chamber 2 toward the back. The air compresses inside the chamber 2, and ulteriorly the ram air exits accelerated through the reduced end of the chamber, ram air outlet 5, as an outward air flow 7. Consequently, the process described generates a suction effect at the first end 9 of the hollow siphoning tubing 3.

The suction force is drawn alongside the interior walls of hollow siphoning tubing 3, and is subsequently manifested at the other end of the hollow siphoning tubing which is connected to an aperture 8 of the vent receptacle 12 via the air flow conduit tubing 11, producing an outward flow or suction. There is a flow regulator valve 10 in the air flow conduit tubing near the vent receptacle, which can be adjusted as required. The receptacle 12 is positioned inside the aircraft or vessel, therefore, the suction produced in the interior of an aircraft or a vessel, such as in the cockpit siphons out unwanted smoke, fluids, odors, and gases. The diameter of the hollow siphoning tubing 3 and aperture 8 are so designed to best suit the type and speed of an aircraft. The air flow conduit tubing 11 is terminated at the vent receptacle which has a removable cover or cap within easy reach of the flight-crew. In the case where no valve is needed, the suction flow could be controlled by the diameter of the hollow siphon tubing 3, or by the removable cover. As shown in FIG. 4, the external housing case resides outside of the aircraft, the hollow siphon tubing 3 intrudes into the interior of the aircraft. The hollow siphon tubing 3 connects to the air flow conduit tubing 11 inside the aircraft.

In the embodiment illustrated by FIG. 1, the external housing case 1 envelopes the funnel shaped chamber 2, which has an angular geometric inner shape 4, for protection, and also has holes 13 for mounting. However, the external housing case can be modified externally and internally to reduce to the lowest practicable profile to conform aerodynamically to the exterior environment of a specific aircraft or a moving vessel, their speed, and performance requirements.

A heater element 14 is located within the molded ram air entrance for anti-icing control, as it could be required by weather conditions. A grill 15, as shown in FIG. 2, at the ram air entrance of the external air receiver is attached for prevention against blockage by debris.

As illustrated by above descriptions, the aircraft smoke extractor of the present invention provides a reliable, lightweight, yet economical device that can be an object of invaluable use in aircraft and other moving vessels, such as trains, automobiles, and boats.

The present invention has been delineated above in detail with specific reference to one type of adopted prototype. These should not be construed as limitations on the scope of the present invention, but rather as an exemplification of one preferred embodiment thereof. It will be apparent, however, that various modifications and changes can be made within the spirit and the spectrum of this invention as described in the above specification and defined in the appended claims and their legal equivalents.

I claim:

1. An extractor system for extracting smoke and other unwanted gases from an interior of a moving vessel, wherein said extractor system comprises:

an external air receiver mounted on the exterior of said moving vessel, wherein said external air receiver resides outside of said moving vessel; said external air receiver having a ram air entrance facing the moving direction of said moving vessel and a ram air outlet facing opposite of the moving direction of said moving vessel, a vent receptacle installed in the interior of said moving vessel, and an air flow conduit tubing interconnecting said external air receiver and said vent receptacle, wherein air flow outside of said moving vessel entering said external air receiver when said moving vessel is in motion induces a suction force sufficient to extract smoke and other unwanted gases from the interior of said moving vessel to the outside of said moving vessel, through said vent receptacle and said air flow conduit tubing.

2. The extractor system of claim 1, wherein said external air receiver comprises:

a housing case, a funnel-shaped chamber situated within said housing case with said ram air entrance at one end of said chamber and with said ram air outlet at the opposite end of said chamber, said funnel-shaped chamber extending longitudinally in said housing case, and a hollow siphoning tubing being affixed at the center of said chamber along a longitudinal axis of said chamber, wherein said hollow siphoning tubing has a first end centered concentrically with said ram air outlet of said chamber, and has a second end connected to said air flow conduit tubing; said hollow siphoning tubing being angled so that said second end exits from said chamber and said housing case in a direction perpendicular to the longitudinal axis of said chamber;

wherein when said moving vessel is in motion, air flow outside said moving vessel enters said ram air entrance and exits through said ram air outlet, and induces said suction force at said first end of said hollow siphoning tubing, said suction force being further induced to said vent receptacle through connection of said air flow conduit tubing.

3. The extractor system of claim 2, wherein said external air receiver further comprises a heating element located near said ram air entrance within said chamber.

4. The extractor system of claim 2, wherein said external air receiver further comprises a grill at said ram air entrance of said chamber.

5. The extractor system of claim 1, wherein said vent receptacle has an aperture connected to said air flow conduit tubing.

6. The extractor system of claim 1, wherein said air flow conduit tubing comprises a valve, located within said moving vessel, for controlling air flow inside said air flow conduit tubing.

7. The extractor system of claim 6, wherein said valve can be operated by one mode selected from the group consisting of (1) automatically, or (2) manually.

8. The extractor system of claim 1, wherein said extractor system is used in conjunction with a smoke sensor.

9. The extractor system of claim 1, wherein said moving vessel is a train.

10. The extractor system of claim 1, wherein said moving vessel is an automobile.

11. The extractor system of claim 1, wherein said moving vessel is a boat.

12. An extractor system for extracting smoke and other unwanted gases from an interior of a moving vessel, wherein said extractor system comprises:

(a) an external air receiver mounted on the exterior of said moving vessel, said external air receiver comprising:
   a housing case,
   a funnel-shaped chamber situated within said housing case with a ram air entrance and a ram air outlet, said funnel-shaped chamber extended longitudinally in said housing case, and
   a hollow siphoning tubing being affixed at the center of said chamber along a longitudinal axis of said chamber, wherein said hollow siphoning tubing has a first end centered concentrically with said ram air outlet of said chamber, and has a second end connected to said air flow conduit tubing; said hollow siphoning tubing is angled so that said second end exits from said chamber and said housing case in a direction perpendicular to the longitudinal axis of said chamber;

(b) a vent receptacle installed in the interior of said moving vessel, and (c) an air flow conduit tubing interconnecting said external air receiver and said vent receptacle;

wherein air flow outside of said moving vessel entering said external air receiver when said moving vessel is in motion induces a suction force sufficient to extract smoke and other unwanted gases from the interior of said moving vessel to the outside of said moving vessel, through said vent receptacle and said air flow conduit tubing.

13. An extractor system for extracting smoke and other unwanted gases from interior of an aircraft, wherein said extractor system comprises:
   an external air receiver mounted outside the fuselage of said aircraft, wherein said external air receiver resides outside of said fuselage, said external air receiver having a ram air entrance facing the moving direction of said aircraft and a ram air outlet facing opposite of the moving direction of said aircraft,
   a vent receptacle installed in the interior of said aircraft, and
   an air flow conduit tubing interconnecting said external air receiver and said vent receptacle,
   wherein air flow outside of said aircraft entering said external air receiver when said aircraft is in motion induces a suction force sufficient to extract smoke and other unwanted gases from the interior of said aircraft to the outside of said aircraft, through said vent receptacle and said air flow conduit tubing.

14. The extractor system of claim 13, wherein said external air receiver comprises:
   a housing case,
   a funnel-shaped chamber situated within said housing case with said ram air entrance at one end of said chamber and with said ram air outlet at the opposite end of said chamber, said funnel-shaped chamber extending longitudinally in said housing case, and
   a hollow siphoning tubing being affixed at the center of said chamber along a longitudinal axis of said chamber, wherein said hollow siphoning tubing has a first end centered concentrically with said ram air outlet of said chamber, and has a second end connected to said air flow conduit tubing; said hollow siphoning tubing being angled so that said second end exits from said chamber and said housing case in a direction perpendicular to the longitudinal axis of said chamber;
   wherein when said aircraft is in motion, air flow outside said aircraft enters said ram air entrance and exits through said ram air outlet, and induces said suction force at said first end of said hollow siphoning tubing, said suction force being further induced to said vent receptacle through connection of said air flow conduit tubing.

15. The extractor system of claim 14, wherein said external air receiver further comprises a heating element located near said ram air entrance within said chamber.

16. The extractor system of claim 14, wherein said external air receiver further comprises a grill at said ram air entrance of said chamber.

17. The extractor system of claim 13, wherein said vent receptacle has an aperture connected to said air flow conduit tubing.

18. The extractor system of claim 13, wherein said air flow conduit tubing comprises a valve, located within said aircraft, for controlling air flow inside said air flow conduit tubing.

19. The extractor system of claim 18, wherein said valve can be operated by one mode selected from the group consisting of (1) automatically, or (2) manually.

20. The extractor system of claim 13, wherein said extractor system is used for extracting smoke and other unwanted gases from the cockpit of said aircraft, and said vent receptacle being installed inside said cockpit of said aircraft.

* * * * *